United States Patent
Iyatani

(10) Patent No.: US 7,753,456 B2
(45) Date of Patent: Jul. 13, 2010

(54) VEHICLE BRAKE HYDRAULIC PRESSURE CONTROL UNIT

(75) Inventor: Masatoshi Iyatani, Nagano (JP)

(73) Assignee: Nissin Kogyo Co., Ltd., Nagano-Ken (JP)

( * ) Notice: Subject to any disclaimer, the term of this patent is extended or adjusted under 35 U.S.C. 154(b) by 933 days.

(21) Appl. No.: 11/278,033

(22) Filed: Mar. 30, 2006

(65) Prior Publication Data

US 2006/0220768 A1  Oct. 5, 2006

(30) Foreign Application Priority Data

Apr. 1, 2005 (JP) .................. P2005-105793

(51) Int. Cl.
*B60T 8/36* (2006.01)

(52) U.S. Cl. .............................. 303/119.3; 303/DIG. 10

(58) Field of Classification Search .............. 303/119.3, 303/DIG. 10
See application file for complete search history.

(56) References Cited

U.S. PATENT DOCUMENTS

| | | | | |
|---|---|---|---|---|
| 6,102,495 A * | 8/2000 | Zaviska | ............ | 303/116.4 |
| 6,234,199 B1 * | 5/2001 | Nohira | .................. | 137/557 |
| 6,846,050 B2 * | 1/2005 | Inoue et al. | ............ | 303/119.3 |
| 2004/0046446 A1 | 3/2004 | Dinkel et al. | | |

FOREIGN PATENT DOCUMENTS

| | | |
|---|---|---|
| DE | 42 34 013 | 10/1992 |
| DE | 199 59 670 | 12/1999 |
| DE | 102 37 163 | 2/2004 |
| EP | 0 887 242 | 12/1998 |
| JP | 06-179362 | 6/1994 |
| JP | 11-208440 | 8/1999 |
| JP | 11-304076 | 11/1999 |
| JP | 2000-177560 | 6/2000 |
| JP | 2004-75052 | 3/2004 |
| JP | A-2004-75052 | 3/2004 |
| JP | 2005-145239 | 6/2005 |
| WO | 02/42134 | 5/2002 |

OTHER PUBLICATIONS

European Search Report of Corresponding European Application No. 0600958.0.
Japanese Office Action for corresponding Japanese Patent Application No. 2005-105793.
Japanese Office Action dated Aug. 5, 2009 for corresponding Japanese Patent Application No. 2005-105793.

\* cited by examiner

*Primary Examiner*—Bradley T King
(74) *Attorney, Agent, or Firm*—Andrew M. Calderon; Roberts Mlotkowski Safran & cole, P.C.

(57) ABSTRACT

A vehicle brake hydraulic pressure control unit in which a pair of regulator valves, four normally open electromagnetic valves, a pair of reservoirs, four normally closed electromagnetic valves, a pair of pumps and a pair of suction valves are provided in a common base unit with the normally open electromagnetic valves and the normally closed electromagnetic valves arranged in parallel with each other. A pair of primary and secondary suction valves are arranged collectively to lie between four normally open electromagnetic valves and four normally closed electromagnetic valves which are arranged in parallel with each other and individually to lie between each set of two ports 24A, 24B; 24C, 24D from each end of four ports 24A, 24B, 24C, 24D.

20 Claims, 4 Drawing Sheets

VEHICLE BRAKE HYDRAULIC PRESSURE CONTROL UNIT

The present invention claims foreign priority to Japanese patent application No. P.2005-105793, filed on Apr. 1, 2005, the contents of which is incorporated herein by reference.

BACKGROUND OF THE INVENTION

1. Field of the Invention

The present invention relates to a vehicle brake hydraulic pressure control unit which includes a pair of regulator valves which are interposed between a pair of output ports provided on a tandem master cylinder and a pair of hydraulic pressure lines which correspond, respectively, to the pair of output ports, respectively, four normally open electromagnetic valves which are interposed between four road wheel brakes, which correspond to both the output ports with two corresponding to each port, and both the hydraulic pressure lines in such a manner as to correspond to the four road wheel brakes, respectively, a pair of reservoirs which correspond to both the output ports, respectively, four normally closed electromagnetic valves which are interposed between both the reservoirs and the four road wheel brakes, respectively, with each corresponding to one of the reservoirs and each of two of the four road wheel brakes, a pair of pumps which can pump brake fluid from both the reservoirs to pressurize the brake fluid so pumped for outputting to both the hydraulic pressure lines and a pair of suction valves which are interposed between both the output ports and suction sides of both the pumps, respectively, which constituent components are all provided in a common base unit with the normally open electromagnetic valves and the normally closed electromagnetic valves arranged in parallel with each other.

2. Description of the Background Art

A vehicle brake hydraulic pressure control unit has already been known in, for example, Japanese Patent Unexamined Publication No. JP-A-2004-75052 in which a pair of regulator valves, four normally open electromagnetic valves, a pair of reservoirs, four normally closed electromagnetic valves, a pair of pumps and a pair of suction valves are provided in a common base unit.

In the vehicle brake hydraulic pressure control unit of the JP-A-2004-75052, however, the pair of suction valves are provided in the base unit in such a manner as to be arranged out of the four normally open electromagnetic valves and the four normally closed electromagnetic valves which are arranged in parallel with each other, and this leads to an increase in size of the base unit, that is, the vehicle brake hydraulic pressure control unit.

SUMMARY OF THE INVENTION

The invention was made in view of the situations and an object thereof is to provided a vehicle brake hydraulic pressure control unit which can realize a reduction in size thereof.

With a view to accomplishing the object, according to a first aspect of the invention, there is provided a vehicle brake hydraulic pressure control unit comprising a base unit, comprising:

a pair of regulator valves which are interposed between a pair of output ports provided on a tandem master cylinder and a pair of hydraulic pressure lines corresponding to the respective pair of output ports, respectively;

four normally open electromagnetic valves which are interposed between four road wheel brakes, which correspond to both the output ports with two corresponding to each port, and both the hydraulic pressure lines in such a manner as to correspond to the four road wheel brakes, respectively;

a pair of reservoirs which correspond to both the output ports, respectively;

four normally closed electromagnetic valves which are interposed between both the reservoirs and the four road wheel brakes, respectively, in such a manner as to correspond to each one of the reservoirs and each of two of the four road wheel brakes;

a pair of pumps which pump brake fluid from both the reservoirs to pressurize the brake fluid so pumped for outputting to both the hydraulic pressure lines; and a pair of suction valves which are interposed between both the output ports and suction sides of both the pumps, respectively, wherein the normally open electromagnetic valves and the normally closed electromagnetic valves are arranged in parallel with each other, wherein four ports, which connect to the four road wheel brakes, respectively, are provided on one external surface of the base unit in such a manner as to be aligned in parallel with a direction in which the normally open electromagnetic valves and the normally closed electromagnetic valves are arranged in parallel with each other, and wherein both the suction valves are arranged collectively to lie between the normally open electromagnetic valves and the normally closed electromagnetic valves which are arranged in parallel with each other, and are arranged individually to lie between each set of the two ports from each end of the aligned four ports.

According to a second aspect of the invention, there is provided a vehicle brake hydraulic pressure control unit as set forth in the first aspect of the invention, wherein both the pumps are arranged between the normally open electromagnetic valves and the normally closed electromagnetic valves which are arranged in parallel with each other in the base unit.

According to the first aspect of the invention, the base unit can be reduced in size by disposing the pair of suction valves by making effective use of a space produced between the normally open electromagnetic valves and the normally closed electromagnetic valves which are provided four each in such a manner as to be disposed in parallel with each other, whereby the vehicle brake hydraulic pressure unit can be reduced in size.

According to the second aspect of the invention, by disposing the pair of pumps by making effective use of the space produced between the normally open electromagnetic valves and the normally closed electromagnetic valves which are provided four each in such a manner as to be in parallel with each other, not only can the base unit be reduced further in size, whereby the vehicle brake hydraulic pressure unit can be reduced further in size, but also a distance between the suction valves and the pumps can be reduced to thereby reduce the overall volume of flow paths which connect the suction valves and the pumps together, whereby a pressurizing response when the pumps are activated can be increased.

BRIEF DESCRIPTION OF THE DRAWINGS

FIG. 2 is viewed in a direction indicated by an arrow III shown therein;

FIG. 3 is viewed in a direction indicated by an arrow IV therein;

DETAILED DESCRIPTION OF THE PREFERRED EMBODIMENTS

Hereinafter, a mode for carrying out the invention will be described based on an embodiment of the invention which is shown in the accompanying drawings.

Figure 1:
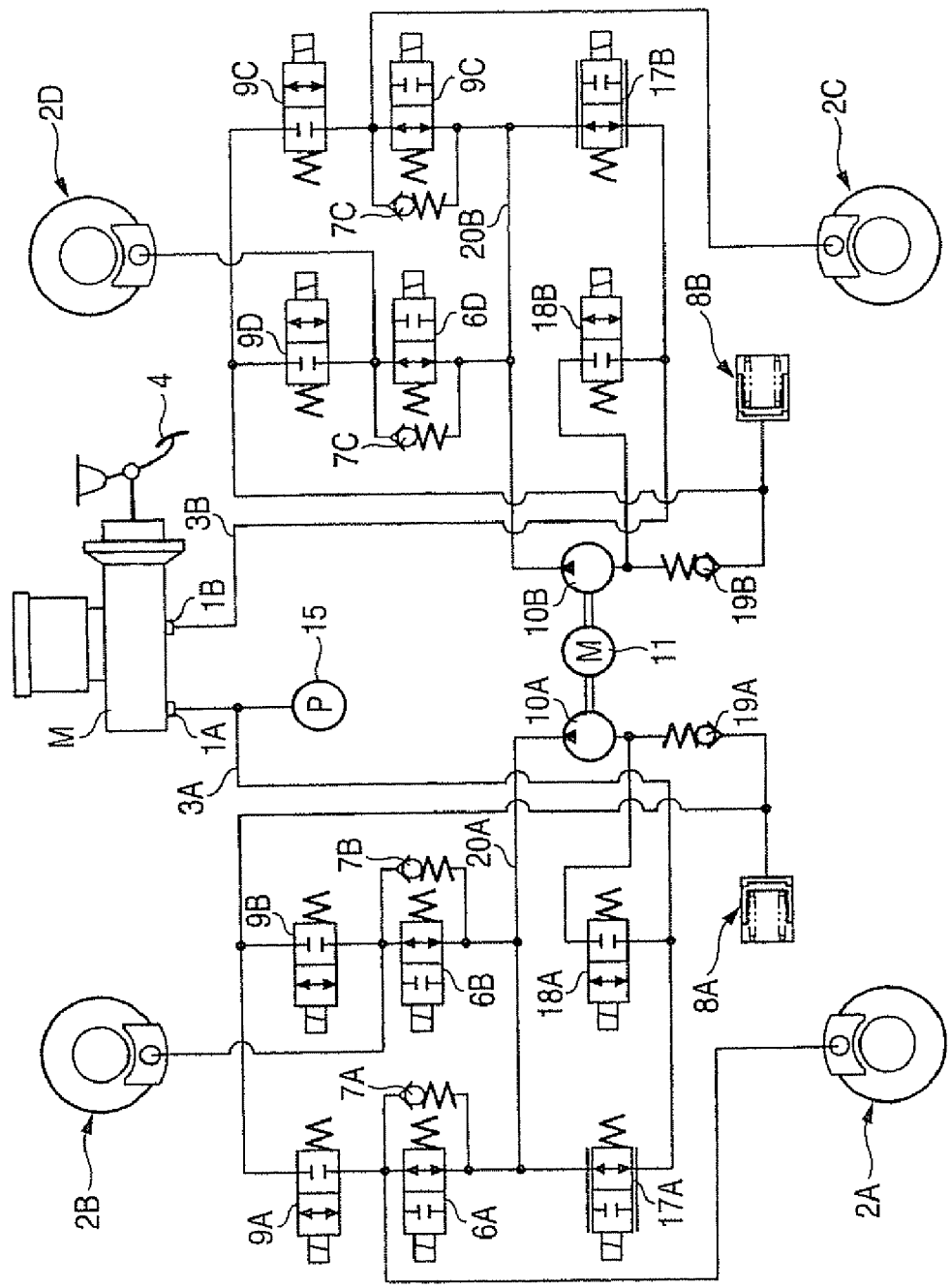
FIG. 1 is a circuit diagram which shows the configuration of a vehicle brake hydraulic pressure control unit.
Figure 2:
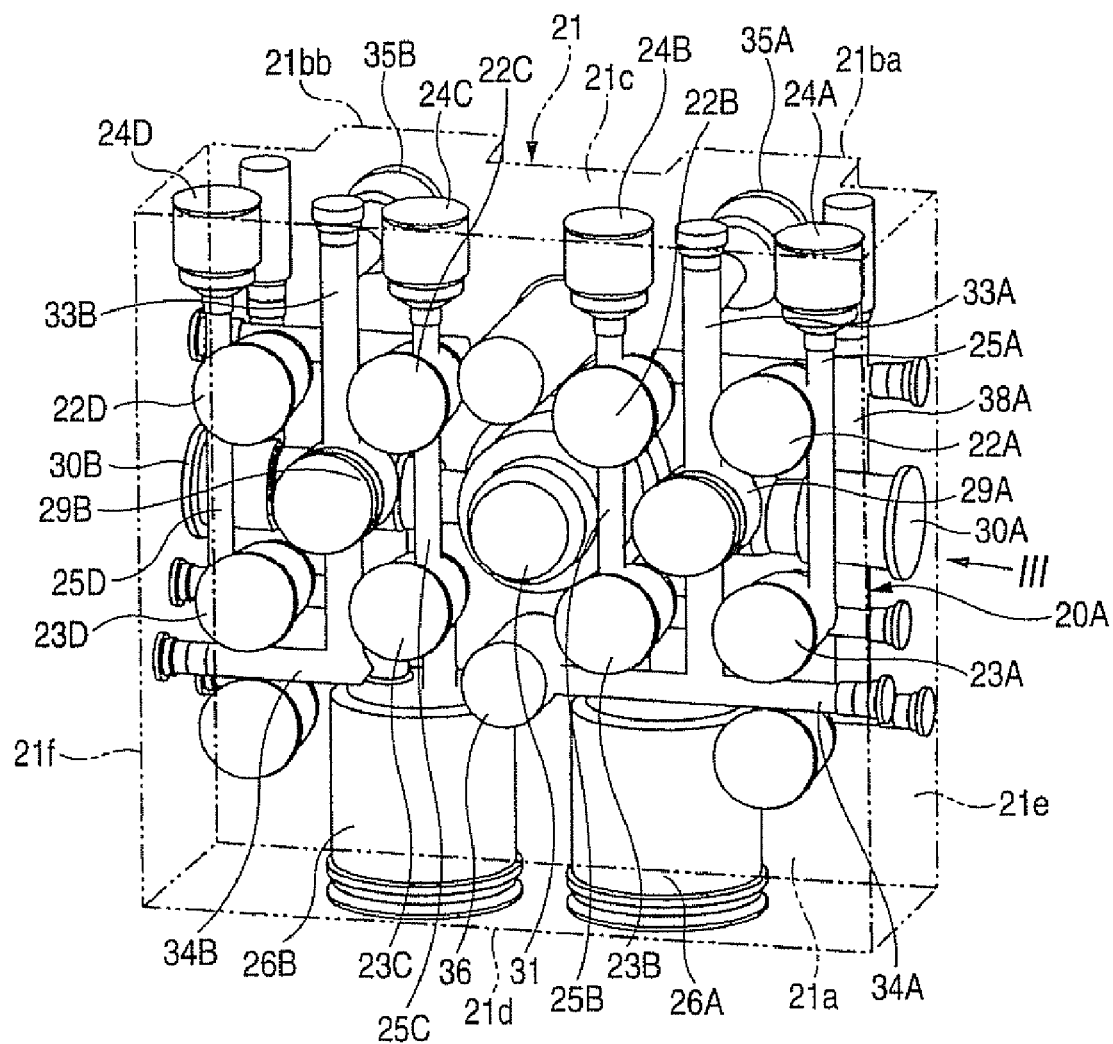
FIG. 2 is a perspective view of what reside in an empty space in a base unit.
Figure 3:
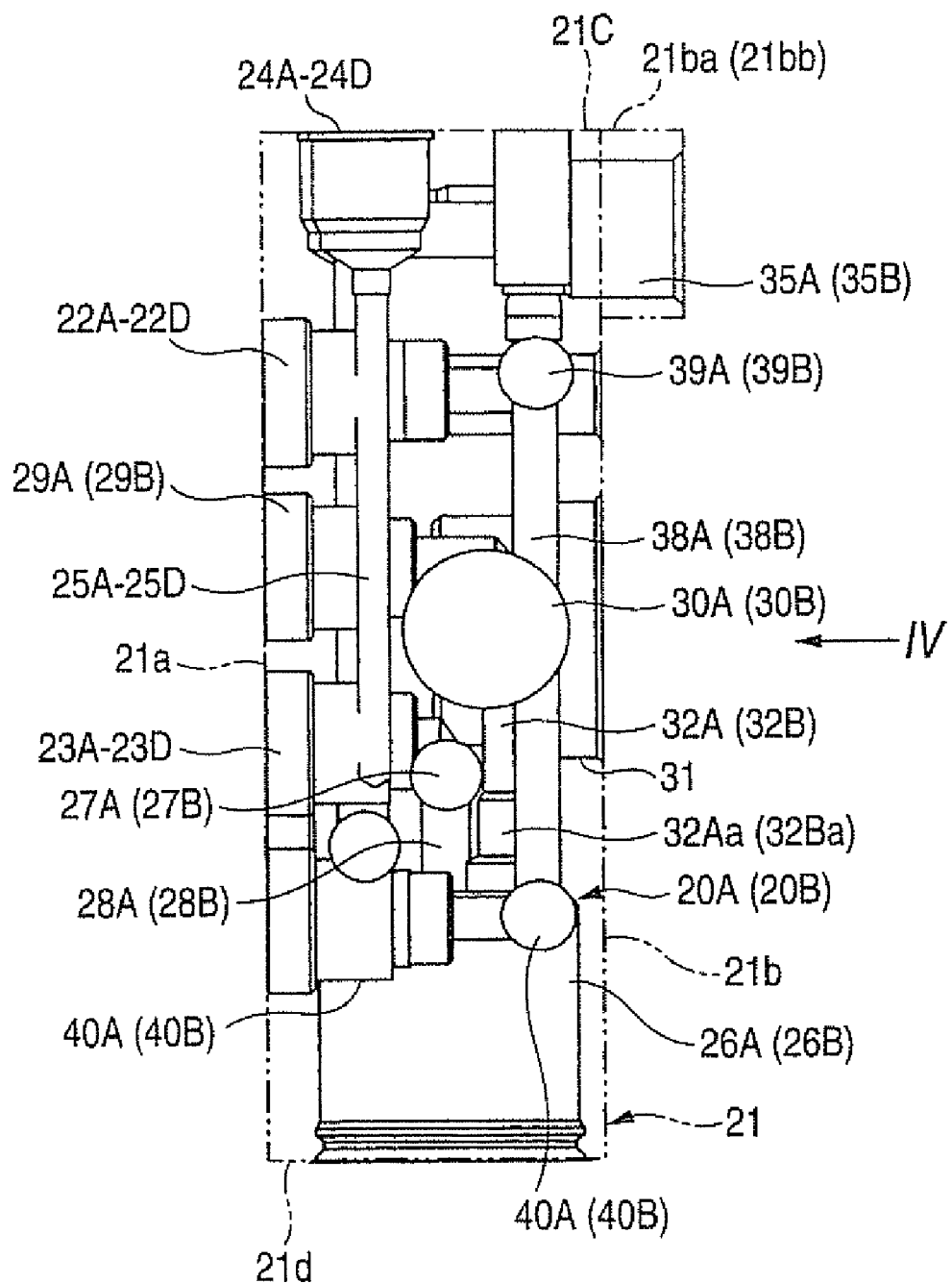
FIG. 3 is a view resulting when
Figure 4:
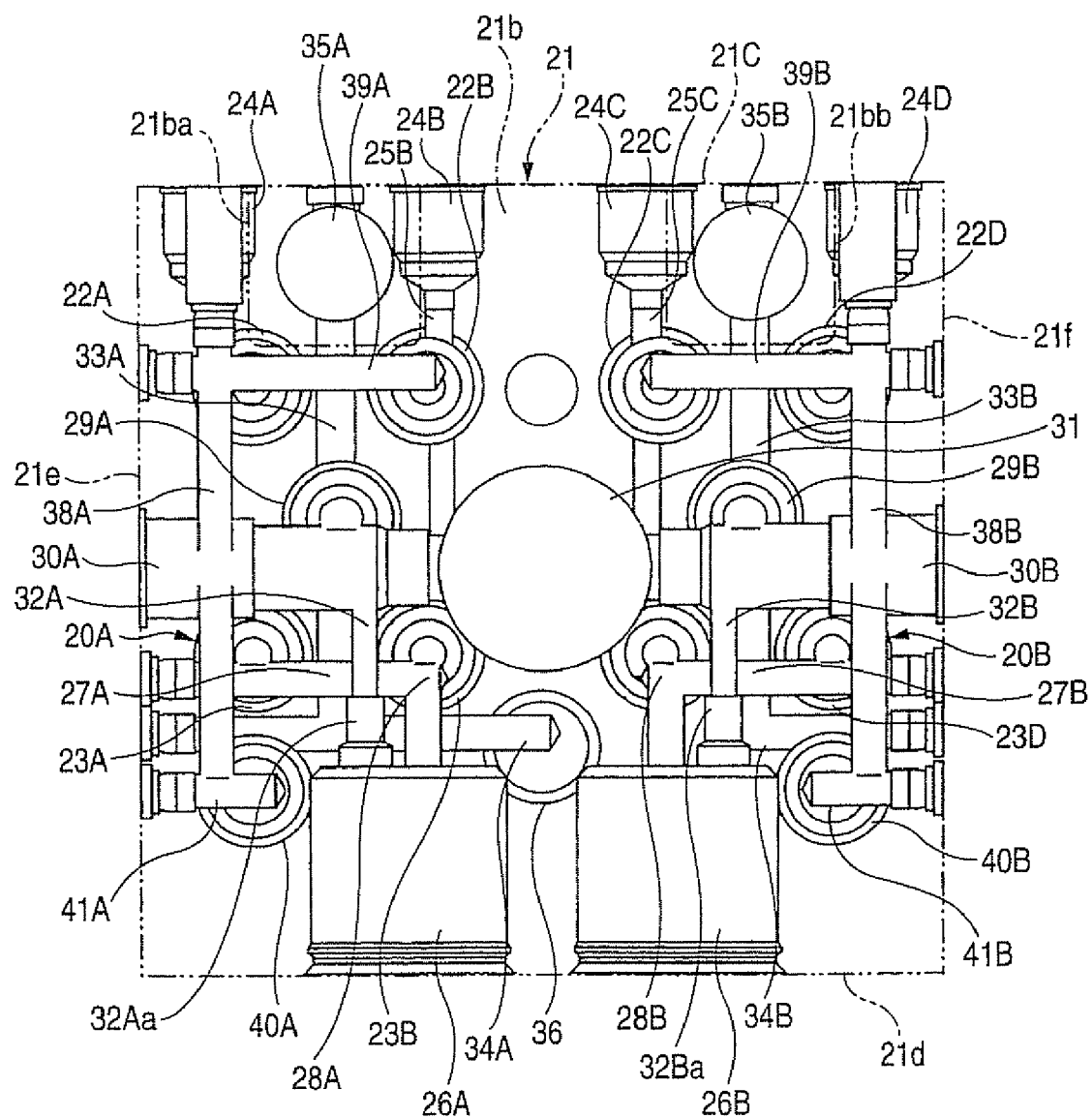
FIG. 4 is a view resulting when

FIGS. 1 to 4 are drawings showing an embodiment of the invention, in which FIG. 1 is a circuit diagram which shows the configuration of a vehicle brake hydraulic pressure control unit, FIG. 2 is a perspective view which shows what reside in an empty space in a base unit, FIG. 3 is a view resulting when FIG. 2 is viewed in a direction indicated by an arrow III shown therein, and FIG. 4 is a view resulting when FIG. 3 is viewed in a direction indicated by an arrow IV therein.

Firstly, in FIG. 1, a tandem master cylinder M includes a primary and secondary output ports 1A, 1B which generate brake hydraulic pressure according to pedal effort applied to a brake pedal 4 by the driver of a vehicle, and the primary output port 1A connects to a primary output hydraulic pressure line 3A, the secondary output port 1B connecting to a secondary output hydraulic pressure line 3B.

The primary output hydraulic pressure line 3A connects to a primary hydraulic pressure line 20A via a primary regulator valve 17A, which is a normally open linear electromagnetic valve, and the secondary output hydraulic pressure line 3B connects to a secondary hydraulic pressure line 20B via a secondary regulator valve 17B, which is a normally open linear electromagnetic valve.

The primary hydraulic pressure line 20A connects to a left front road wheel brake 2A and a right rear road wheel brake 2B via a normally open electromagnetic valve 6A and a normally open electromagnetic valve 6B, respectively. In addition, the secondary hydraulic pressure line 20B connects to a right front road wheel brake 2C and a left rear road wheel brake 2D via a normally open electromagnetic valve 6C and a normally open electromagnetic valve 6D, respectively. Furthermore, check valves 7A, 7B, 7C, 7D connect in parallel to the normally open electromagnetic valves 6A, 6B, 6C, 6D, respectively.

Normally closed electromagnetic valves 9A, 9B are provided between a primary reservoir 8A which corresponds to the primary hydraulic pressure line 20A and the left front road wheel brake 2A and the right rear road wheel brake 2B, respectively, and normally closed electromagnetic valves 9C, 9D are provided between a secondary reservoir 8B which corresponds to the secondary hydraulic pressure line 20B and the right front road wheel brake 2C and the left rear road wheel brake 2D, respectively.

The primary and secondary reservoirs 8A, 8B connect to suction sides of primary and secondary pumps 10A, 10B, which are driven by a common electric motor 11, via one-way valves 19A, 19B which permit the passage of brake fluid to the pumps 10A, 10B, respectively. In addition, the primary and secondary output hydraulic pressure lines 3A, 3B connect to somewhere between the primary and secondary pumps 10A, 10B and the one-way valves 19A, 19B via primary and secondary suction valves 18A, 18B, respectively, which are normally closed electromagnetic valves, and the primary and secondary hydraulic pressure lines 20A, 20B connect to discharge sides of the primary and secondary pumps 10A, 10B, respectively.

At the time of normal braking where there exists no possibility that the individual road wheels are locked, the normally open electromagnetic valves 6A, 6B, 6C, 6D are deenergized to be in an open state, while the normally closed electromagnetic valves 9A, 9B, 9C, 9D are deenergized to be in a closed state, whereby brake hydraulic pressure that is outputted from the primary output port 1A of the master cylinder M acts on the left front and right rear road wheel brakes 2A, 2B via the normally open electromagnetic valves 6A, 6B, respectively. In addition, brake hydraulic pressure that is outputted from the secondary output port 1B of the master cylinder M acts on the right front and left rear road wheel brakes 2C, 2D via the normally open electromagnetic valves 6C, 6D, respectively.

In the event that, for example, one of the road wheels is about to be locked during the normal braking, the normally open electromagnetic valve of the normally open electromagnetic valves 6A, 6B, 6C, 6D which corresponds to the road wheel which is about to be locked is energized to be closed, and the normally closed electromagnetic valve of the normally closed electromagnetic valves 9A, 9B, 9C, 9D which corresponds to the relevant road wheel is energized to be opened, whereby part of the brake hydraulic pressure acting on the road wheel which is about to be locked is sucked into the primary reservoir 8A or the secondary reservoir 8B, so that the brake hydraulic pressure of the road wheel which is about to be locked is reduced.

In addition, when holding brake hydraulic pressure constant, the normally open electromagnetic valves 6A, 6B, 6C, 6D are energized to be closed, and the normally closed electromagnetic valves 9A, 9B, 9C, 9D are deenergized to stay in the closed state, and furthermore, when increasing brake hydraulic pressure, the normally open electromagnetic valves 6A, 6B, 6C, 6D are deenergized to stay in the open state, and the normally closed electromagnetic valves 9A, 9B, 9C, 9D are also deenergized to stay in the closed state.

Thus, an efficient braking can be effected without causing the road wheel or road wheels to be locked by controlling the energization and deenergization of the normally open electromagnetic valves 6A, 6B, 6C, 6D and the normally closed electromagnetic valves 9A, 9B, 9C, 9D.

Incidentally, the electric motor 11 continues to operate rotationally during an anti-locking brake control like the one described above, and since the primary and secondary pumps 10A, 10B are driven in association with the operation of the electric motor 11, brake fluid sucked into the primary and secondary reservoirs 8A, 8B is sucked into the primary and secondary pumps 10A, 10B, respectively, and is then caused to reflux or flow back to the primary and secondary output hydraulic pressure lines 3A, 3B via the primary and secondary hydraulic pressure lines 20A, 20B and the primary and secondary regulator valves 17A, 17B, respectively. An increase in travel of the brake pedal 4 due to the suction of brake fluid into the primary and secondary reservoirs 8A, 8B can be prevented by the reflux of brake fluid like this.

Thus, by allowing the electric motor 11 to operate in such a state that the suction valves 18A, 18B are energized to stay in an open state, the primary and secondary pumps 10A, 10B suck brake fluid from the master cylinder M side to pressurize the same and discharge the brake fluid so pressurized to the primary and secondary hydraulic pressure lines 20A, 20B, respectively, and the hydraulic pressures in the primary and secondary hydraulic pressure lines 20A, 20B can be regulated by the regulator valves 17A, 17B, respectively, whereby an automatic brake control including vehicle behavior stabilizing control and traction control can be effected by allowing the regulated brake fluid pressures to act on the individual road wheel brakes 2A, 2B, 2C, 2D.

In addition, a pressure sensor 15 for detecting an output hydraulic pressure that is outputted from the master cylinder M according to an operation of the brake pedal 4 connects to the primary output hydraulic pressure line 3A which continues to the primary output port 1A of the master cylinder M.

Incidentally, the primary and secondary regulator valves 17A, 17B, the four normally open electromagnetic valves 6A, 6B, 6C, 6D which incorporate therein their respective check valves 7A, 7B, 7C, 7D, the primary and secondary reservoirs 8A, 8B, the four normally closed electromagnetic valves 9A, 9B, 9C, 9D, the primary and secondary pumps 10A, 10B, the primary and secondary suction valves 18A, 18B, the pair of one-way valves 19A, 19B and the pressure sensor 15 are provided in a common base unit 21 shown in FIGS. 2 to 4.

In FIGS. 2 to 4, the base unit 21 has a rectangular primary surface 21a, a rectangular secondary surface 21b which faces an opposite side to the primary surface 21a, a flat upper surface 21c which connects together upper portions of the primary and secondary surfaces 21a, 21b at right angles, a flat lower surface 21d which connects together lower portions of the primary and secondary surfaces 21a, 21b at right angles and flat primary and secondary side surfaces 21e, 21f which connect together both side portions of the primary and secondary surfaces 21a, 21b and both side portions of the upper surface 21c and the lower surface 21d at right angles, respectively, and is formed of a rigid material such as metal into a block-like shape.

Four normally open electromagnetic valve installing holes 22A, 22B, 22C, 22D, which are bottomed and are made to open to the primary surface 21a, are provided in the base unit 21 at a portion which lies close to the upper surface 21c in such a manner as to be aligned horizontally, preferably on a straight line, while being spaced apart from each other, and four normally closed electromagnetic valve installing holes 23A, 23B, 23C, 23D, which are bottomed and are made to open to the primary surface 21a, are provided in the base unit 21 below the normally open electromagnetic valve installing holes 22A, 22B, 22C, 22D in such a manner as to be aligned horizontally, preferably on a straight line, in parallel with a direction in which the normally open electromagnetic valve installing holes 22A, 22B, 22C, 22D are arranged while being spaced apart from each other. Moreover, an interval between the normally open electromagnetic valve installing holes 22A, 22B, an interval between the normally open electromagnetic valve installing holes 22C, 22D, an interval between the normally closed electromagnetic valve installing holes 23A, 23B and an interval between the normally closed electromagnetic valves 23C, 23D are set to be equal to each other, whereas an interval between the normally open electromagnetic valve installing holes 22B, 22C is set to be equal to an interval between the normally closed electromagnetic valve installing holes 23B, 23C and larger than the interval between the normally open electromagnetic valve installing holes 22A, 22B, the interval between the normally open electromagnetic valve installing holes 22C, 22D, the interval between the normally closed electromagnetic valve installing holes 23A, 23B and the interval between the normally closed electromagnetic valve installing holes 23C, 23D.

The normally open electromagnetic valves 6A, 6B, 6C, 6D are installed in the normally open electromagnetic valve installing holes 22A, 22B, 22C, 22D, respectively, from the primary surface 21a side of the base unit 21, and the normally closed electromagnetic valves 9A, 9B, 9C, 9D are installed in the normally closed electromagnetic valve installing holes 23A, 23B, 23C, 23D, respectively, from the primary surface 21a side of the base unit 21. Namely, the normally open electromagnetic valves 6A, 6B, 6C, 6D and the normally closed electromagnetic valves 9A, 9B, 9C, 9D are provided in the base unit 21 in such a manner as to be arranged in parallel with each other.

Four ports 24A, 24B, 24C, 24D which are made to open to the upper surface 21c are provided in the base unit in such a manner as to spaced apart from each other while being aligned in parallel with the direction in which the normally open electromagnetic valve installing holes 22A, 22B, 22C, 22D and the normally closed electromagnetic valve installing holes 23A, 23B, 23C, 23D are arranged in parallel with each other. In addition, passageways 25A, 25B, 25C, 25D are provided in the base unit 21 in such a manner as to extend vertically from axially intermediate portions of the normally closed electromagnetic valve installing holes 23A, 23B, 23C, 23D with their lower ends made to open to the respective intermediate portions to thereby be brought into coaxial communication with the ports 24A, 24B, 24C, 24D, respectively, at upper ends thereof, and intermediate portions of the passageways 25A, 25B, 25C, 25D are made to open to inner surfaces of the normally open electromagnetic valve installing holes 22A, 22B, 22C, 22D, respectively. The ports 24A, 24B, 24C, 24D connect to the left front, right rear, right front and left rear road wheel brakes 2A, 2B, 2C, 2D, respectively.

Two reservoir installing holes 26A, 26B which are bottomed and are made to open to the lower surface 21d are provided in the base unit 21 below the normally closed electromagnetic valve installing holes 23B, 23C, respectively, and the primary reservoir 8A is installed in the reservoir installing hole 26A, and the secondary reservoir 8B is installed in the other reservoir installing hole 26B.

In addition, a bottomed communication hole 27A and a bottomed communication hole 27B are provided coaxially with each other in the base unit 21, and the bottomed communication hole 27A extends horizontally from the primary side surface 21e side in such a manner as to communicate with interiors of the normally closed electromagnetic valve installing holes 23A, 23B in which the normally closed electromagnetic valves 9A, 9B which correspond to the primary output port 1A of the master cylinder M are installed, while the bottomed communication hole 27B extends horizontally from the secondary side surface 21f side in such a manner as to communicate with interiors of the normally closed electromagnetic valve installing holes 23C, 23D in which the normally closed electromagnetic valves 9C, 9D which correspond to the secondary output port 1B of the master cylinder M, open ends of the communication holes 27A, 27B to the primary and secondary side surfaces 21e, 21f, respectively, being closed fluid tightly by means of plugs, not shown. Moreover, upper ends of communication holes 28A, 28B, which are provided in the base unit 21 in such a manner as to extend, respectively, from closed ends of the reservoir installing holes 26A, 26B, are made to communicate with inner ends of both the communication holes 27A, 27B, respectively. Namely, brake fluid which flows out of the normally closed electromagnetic valves 9A, 9B in association with the opening of the normally closed electromagnetic valves 9A, 9B is led into the primary reservoir 8A via the communication holes 27A, 28A, whereas brake fluid which flows out of the normally closed electromagnetic valves 9C, 9D in association with the opening of the normally closed electromagnetic valves 9C, 9D is led into the secondary reservoir 8B via the communication holes 27B, 28B.

Bottomed suction valve installing holes 29A, 29B are provided in the base unit 21 in such a manner as to open to the primary surface 21a between the normally open electromagnetic valve installing holes 22A, 22B, 22C, 22D and the normally closed electromagnetic valve installing holes 23A, 23B, 23C, 23D which are arranged in parallel with each other. Both the suction valve installing holes 29A, 29B are such as to be arranged individually to lie between each set of two ports 24A, 24B; 24C, 24D from each end of the aligned four ports 24A, 24B, 24C, 24D which are made to open to the upper surface 21c of the base unit 21, and in this embodiment, the suction valve installing hole 29A is provided in the base unit 21 in such a manner as to be positioned at a central portion of the normally open electromagnetic valve holes 22A, 22B and the normally closed electromagnetic valves 23A, 23B, whereas the other suction valve installing hole 29B is provided in the base unit 21 in such a manner as to be positioned at a central portion of the normally open electromagnetic valves 22C, 22D and the normally closed electromagnetic valves 23C, 23D.

The primary suction valve 18A is installed in the suction valve installing hole 29A, and the secondary suction valve 18B is installed in the other suction valve installing hole 29B, and both the suction valves 18A, 18B are arranged collectively to lie between the normally open electromagnetic valves 22A, 22B, 22C, 22D and the normally closed electromagnetic valves 23A, 23B, 23C, 23D which are arranged in parallel with each other and individually to lie between each set of two ports 24A, 24B; 24C, 24D from each end of the aligned four ports 24A, 24B, 24C, 24D.

Pump installing holes 30A, 30B are provided in the base unit 21 between the normally open electromagnetic valves 22A, 22B, 22C, 22D and the normally closed electromagnetic valves 23A, 23B, 23C, 23D which are arranged in parallel with each other in such a manner as to extend horizontally across lower end portions at inner ends of the suction valve installing holes 29A, 29B, and an outer end of the pump installing hole 30A is made to open to the primary side surface 21e, whereas an outer end of the other pump installing hole 30B is made to open to the secondary side surface 21f.

The primary pump 10A is installed in the pump installing hole 30A with a communication portion with the suction valve installing hole 29A made to constitute a suction side thereof, while the secondary pump 10B is installed in the other pump installing hole 30B with a communication portion with the suction valve installing hole 29B made to constitute a suction side thereof. Namely, the primary and secondary pumps 10A, 10B are provided in the base unit 21 between the normally open electromagnetic valve installing holes 22A, 22B, 22C, 22D and the normally closed valve installing holes 23A, 23B, 23C, 23D which are arranged in parallel with each other.

A recess 31 of a circular cross section which establishes a communication between inner ends of both the pump installing holes 30A, 30B is provided in the base unit 21 in such a manner as to open to the secondary surface 21b. On the other hand, the electric motor 11 is mounted on the secondary surface 21b of the base unit 21 in such a manner as to cover an open end of the recess 31, and an eccentric cam (not shown) which continues to a rotating shaft of the electric motor 11 is accommodated in the recess 31 in such a manner as to drive the primary and secondary pumps 10A, 10B which are plunger pumps.

Communication holes 32A, 32B, which have, respectively, large-diameter one-way valve installing portions 32Aa, 32Ba in which the one-way valves 19A, 19B are allowed to be installed at intermediate positions along the length thereof, are provided in the base unit 21 in such a manner as to upwardly extend, respectively, from the closed ends of the reservoir installing holes 26A, 26B, and upper ends of the communication holes 32A, 32B are made to open to the pump installing holes 30A, 30B in such a manner as to communicate with the suction sides of the primary and secondary pumps 10A, 10B, respectively.

Regulator valve installing holes 40A, 40B, which are bottomed and are made to open to the primary surface 21a, are provided below the normally closed valve installing holes 23A, 23D, respectively, in the base unit 21, and the primary regulator valve 17A is installed in the regulator valve installing hole 40A, and the secondary regulator valve 17B is installed in the other regulator valve installing hole 40B.

Communication holes 33A, 33B are provided in the base unit 21 in such a manner as to extend vertically to intersect the suction valve installing holes 29A, 29B, and open ends of these communication holes 33A, 33B to the upper surface 21c are closed fluid tightly by means of plugs, not shown. In addition, a communication hole 34A is provided in the base unit 21 in such a manner as to extend horizontally from the primary side surface 21e side so as to continue to a lower end of the communication hole 33A at right angles to thereby form a substantial T shape with the communication hole 33A, and a communication hole 34B is provided in the base unit 21 in such a manner as to extend horizontally from the secondary side surface 21f side so as to continue to a lower end of the communication hole 33B at right angles at an inner end thereof to thereby form a substantial L shape with the communication hole 33B, open ends of the communication holes 34A, 34B to the primary and secondary side surfaces 21e, 21f being closed fluid tightly by means of plugs, not shown.

The communication hole 34A is provided in such a manner as to extend across an upper portion of the regulator installing hole 40A so as to communicate with an inlet side of the primary regulator valve 17A, and the communication hole 34B is provided in such a manner as to extend across an upper portion of the regulator installing hole 40B so as to communicate with an inlet side of the secondary regulator valve 17B.

Connection ports 35A, 35B which communicate with the communication holes 33A, 33B, respectively are provided in protruding portions 21ba, 21bb which protrude from an upper portion of the secondary surface 21b of the base unit 21, and the connection port 35A connects to the primary output port 1A of the master cylinder M, whereas the other connection port 35B connects to the secondary output port 1B of the master cylinder M. Furthermore, an inner end of the communication hole 34A is made to communicate with a pressure sensor installing hole 36 which is provided in the base unit 21 in such a manner as to open to the primary surface 21a, and the pressure sensor 15 is installed in the pressure sensor installing hole 36.

In addition, communication holes 38A, 38B are provided in the base unit 21 in such a manner as to extend across axially intermediate side portions of the pump installing holes 30A, 30B so as to continue to the discharge sides of the primary and secondary pumps 10A, 10B, respectively.

A communication hole 39A is provided in the base unit 21 in such a manner as to extend horizontally so as to traverse an upper portion of the communication hole 38A to communicate with inner ends of the normally open electromagnetic valve installing holes 22A, 22B, and an open end of the communication hole 39A to the primary side surface 21e is closed fluid tightly by means of a plug, not shown. A communication hole 39B is provided in the base unit 21 in such a manner as to extend horizontally so as to traverse an upper portion of the communication hole 38B to communicate with inner ends of the normally open electromagnetic valve installing holes 22C, 22D, and an open end of the communication hole 39B to the secondary side surface 21f is closed fluid tightly by means of a plug, not shown.

Furthermore, a communication hole 41A is provided in the base unit 21 with an outer end thereof made to open to the primary side surface 21e in such a manner as to extend horizontally so as to communicate with not only an inner end of the regulator valve installing hole 40A at an inner end thereof to thereby continue to an outlet side of the primary regulator valve 17A but also a lower end of the communication hole 38A at an intermediate portion thereof, and a communication hole 41B is provided in the base unit 21 with an outer end thereof made to open to the secondary side surface 21f in such a manner as to extend horizontally so as to communicate with not only an inner end of the regulator valve installing hole 40B at an inner end thereof to thereby continue to an outlet side of the secondary regulator valve 17B but also a lower end of the communication hole 38B at an intermediate portion thereof, the respective outer end open portions of both the communication holes 41A, 41B being closed fluid tightly by means of plugs, not shown.

Thus, the communication holes 38A, 39A, 41A make up the primary hydraulic pressure line 20A into which brake fluid is discharged from the primary pump 10A, and the communication holes 38B, 39B, 41B make up the secondary hydraulic pressure line 20B into which brake fluid is discharged from the secondary pump 10B.

Next, to describe the function of the invention, while the primary and secondary regulator valves 17A, 17B, the four normally open electromagnetic valves 6A, 6B, 6C, 6D which incorporate therein their respective check valves 7A, 7B, 7C, 7D, the primary and secondary reservoirs 8A, 8B, the four normally closed electromagnetic valves 9A, 9B, 9C, 9D, the primary and secondary pumps 10A, 10B, the primary and secondary suction valves 18A, 18B, the pair of one-way valves 19A, 19B, and the pressure sensor 15 are provided in the base unit 21, the normally open electromagnetic valves 6A, 6B, 6C, 6D and the normally closed electromagnetic valves 9A, 9B, 9C, 9D are provided in the base unit 21 in such a manner as to be arranged in parallel with each other, and the four ports 24A, 24B, 24C, 24D, which connect to the road wheel brakes 2A, 2B, 2C, 2D, respectively, are provided in the upper surface 21C, which constitutes one external surface of the base unit 21, in such a manner as to be aligned in parallel with the direction in which the normally open electromagnetic valves 6A, 6B, 6C, 6D and the normally closed electromagnetic valves 9A, 9B, 9C, 9D are arranged in parallel with each other.

Moreover, the primary and secondary suction valves 18A, 18B are arranged collectively to lie between the normally open electromagnetic valves 22A, 22B, 22C, 22D and the normally closed electromagnetic valves 23A, 23B, 23C, 23D which are arranged in parallel with each other and individually to lie between each set of two ports 24A, 24B; 24C, 24D from each end of the aligned four ports 24A, 24B, 24C, 24D which are made to open to the upper surface 21c of the base unit 21. Consequently, the primary and secondary suction valves 18A, 18B are arranged by making effective use of a space produced between the normally open electromagnetic valves 6A, 6B, 6C, 6D and the normally closed electromagnetic valves 9A, 9B, 9C, 9D which are provided four each in such a manner as to be in parallel with each other, so as to reduce the base unit 21 in size, thereby making it possible to reduce the vehicle brake hydraulic pressure control unit in size.

In addition, since the primary and secondary pumps 10A, 10B are provided in the base unit 21 between the normally open electromagnetic valves 6A, 6B, 6C, 6D and the normally closed electromagnetic valves 9A, 9B, 9C, 9D which are arranged in parallel with each other, by disposing the primary and secondary pumps 10A, 10B by making effective use of the space produced between the normally open electromagnetic valves and the normally closed electromagnetic valves which are provided four each in such a manner as to be in parallel with each other, not only can the base unit 21 be reduced further in size, whereby the vehicle brake hydraulic pressure unit can be reduced further in size, but also a distance between the suction valves 18A, 18B and the primary and secondary pumps 10A, 10B can be reduced to thereby reduce the overall volume of flow paths which connect the suction valves 18A, 18B and the primary and secondary pumps 10A, 10B together, whereby a pressurizing response when the primary and secondary pumps 10A, 10B are activated can be increased.

While the embodiment of the invention has been described heretofore, the invention is not limited to the embodiment but can be altered variously with respect to the design thereof without departing from the spirit and scope of the invention.

What is claimed is:

1. A vehicle brake hydraulic pressure control unit comprising a base unit, comprising:

a pair of regulator valves which are interposed between a pair of output ports provided on a tandem master cylinder and a pair of hydraulic pressure lines corresponding to the respective pair of output ports, respectively, four normally open electromagnetic valves which are interposed between four road wheel brakes, which correspond to both the output ports with two corresponding to each port, and both the hydraulic pressure lines in such a manner as to correspond to the four road wheel brakes, respectively;

a pair of reservoirs which correspond to both the output ports, respectively;

four normally closed electromagnetic valves which are interposed between both the reservoirs and the four road wheel brakes, respectively, in such a manner as to correspond to each one of the reservoirs and each of two of the four road wheel brakes;

a pair of pumps which pump brake fluid from both the reservoirs to pressurize the brake fluid so pumped for outputting to both the hydraulic pressure lines; and a pair of suction valves which are interposed between both the output ports and suction sides of both the pumps, respectively, wherein the normally open electromagnetic valves and the normally closed electromagnetic valves are arranged in parallel with each other, wherein four ports, which connect to the four road wheel brakes, respectively, are provided on one external surface of the base unit in such a manner as to be aligned in parallel with a direction in which the normally open electromagnetic valves and the normally closed electromagnetic valves are arranged in parallel with each other, and wherein valves comprising only both the suction valves are arranged collectively to lie between the normally open electromagnetic valves and the normally closed electromagnetic valves which are arranged in parallel with each other, and are arranged individually to lie between each set of two ports from each end of the aligned four ports.

2. A vehicle brake hydraulic pressure control unit as set forth in claim 1, wherein both the pumps are arranged between the normally open electromagnetic valves and the normally closed electromagnetic valves which are arranged in parallel with each other in the base unit.

3. A vehicle brake hydraulic pressure control unit as set forth in claim 1, wherein the base unit has a rectangular primary surface, a rectangular secondary surface which faces an opposite side to the primary surface, a flat upper surface which connects together upper portions of the primary and secondary surfaces at right angles, a flat lower surface which connects together lower portions of the primary and secondary surfaces at right angles, and flat primary and secondary side surfaces which connect together to side portions of the primary and secondary surfaces and to side portions of the upper surface and the lower surface at right angles, respectively.

4. A vehicle brake hydraulic pressure control unit as set forth in claim 3, wherein:
the four normally open electromagnetic valves are installed in four normally open electromagnetic valve installing holes, respectively, which are bottomed and opened to the primary surface, and aligned horizontally, on a straight line, while being spaced apart from each other; and
the four normally closed electromagnetic valves are installed in four normally closed electromagnetic valve installing holes, which are bottomed and opened to the primary surface, and are aligned horizontally, on a straight line, in parallel with a direction in which the normally open electromagnetic valve installing holes are arranged, while being spaced apart from each other.

5. A vehicle brake hydraulic pressure control unit as set forth in claim 4, wherein:
a spacing between a first set of the normally open electromagnetic valve installing holes, a spacing between a second set of the normally open electromagnetic valve installing holes, a spacing between a first set of the normally closed electromagnetic valve installing holes and a spacing between a second set of the normally closed electromagnetic valves are equal; and
a spacing between adjacent normally open electromagnetic valve installing holes of the first and second set is equal to a spacing between adjacent normally closed electromagnetic valve installing holes of the first and second set and larger than each of the spacing between the first set of normally open electromagnetic valve installing holes, the spacing between the second set of normally open electromagnetic valve installing holes, the spacing between the first set of normally closed electromagnetic valve installing holes, and the spacing between the second set of normally closed electromagnetic valve installing holes.

6. A vehicle brake hydraulic pressure control unit as set forth in claim 1, wherein the four ports are open to the flat upper surface.

7. A vehicle brake hydraulic pressure control unit as set forth in claim 4, further comprising passageways provided in the base unit extending vertically from axially intermediate portions of the normally closed electromagnetic valve installing holes with lower ends open to the intermediate portions and in coaxial communication with the four ports, respectively, at upper ends thereof, and intermediate portions of the passageways being open to inner surfaces of the normally open electromagnetic valve installing holes, respectively.

8. A vehicle brake hydraulic pressure control unit as set forth in claim 4, further comprising two reservoir installing holes bottomed and opened to the lower surface below the adjacent normally closed electromagnetic valve installing holes.

9. A vehicle brake hydraulic pressure control unit as set forth in claim 4, further comprising:
a first communication hole and a second communication hole provided coaxially with each other in the base unit;
the first communication hole extending horizontally from the primary side surface so to communicate with interiors of the first set of normally closed electromagnetic valve installing holes; and
the second communication hole extending horizontally from the secondary side surface side so to communicate with interiors of the second set of normally closed electromagnetic valve installing holes.

10. A vehicle brake hydraulic pressure control unit as set forth in claim 9, further comprising:
upper ends of first and second holes extending, respectively, from closed ends of two reservoir installing holes, and communicating with inner ends of the first and second communication holes, respectively.

11. A vehicle brake hydraulic pressure control unit as set forth in claim 5, further comprising:
first and second suction valve installing holes provided in the base unit and opened to the primary surface between the normally open electromagnetic valve installing holes and the normally closed electromagnetic valve installing holes;
the first and second suction valve installing holes being arranged individually to lie between each set of the two ports from each end of the aligned four ports;
the first suction valve installing hole being positioned at a central portion of the first set of normally open electromagnetic valve holes and the first set of normally closed electromagnetic valves; and
the second suction valve installing hole being positioned at a central portion of the second set of normally open electromagnetic valves and the second set of normally closed electromagnetic valves.

12. A vehicle brake hydraulic pressure control unit as set forth in claim 11, further comprising pump installing holes in the base unit between the normally open electromagnetic valves and the normally closed electromagnetic valves extending horizontally across lower end portions at inner ends of the first and second suction valve installing holes, wherein an outer end of a first of the pump installing holes open to the primary side surface, and an outer end of a second of the pump installing holes is open to the secondary side surface.

13. A vehicle brake hydraulic pressure control unit as set forth in claim 8, further comprising first and second communication holes, which have, respectively, larger diameter one-way valve installing portions in which one-way valves are installed at intermediate positions along a length thereof.

14. A vehicle brake hydraulic pressure control unit as set forth in claim 4, further comprising regulator valve installing holes, which are bottomed and opened to the primary surface, and provided below the normally closed valve installing holes closest to an edge of the base unit.

15. A vehicle brake hydraulic pressure control unit as set forth in claim 11, further comprising:
first and second communication holes provided in the base unit and extending vertically to intersect the first and second suction valve installing holes;
a third communication hole provided in the base unit and extending horizontally from the primary side surface side to a lower end of the first communication hole at right angles to form a substantial T shape with the first communication hole; and
a fourth communication hole provided in the base unit and extending horizontally from the secondary side surface side to a lower end of the second communication hole at right angles at an inner end thereof to form a substantial L shape with the second communication hole.

16. A vehicle brake hydraulic pressure control unit as set forth in claim 15, wherein the first communication hole extends across an upper portion of a regulator installing hole so as to communicate with an inlet side of a primary regulator valve of the pair of regulator valves, and the second communication hole extends across an upper portion of another regulator installing hole so as to communicate with an inlet side of a secondary regulator valve.

17. A vehicle brake hydraulic pressure control unit comprising:
   a base unit comprising:
      a plurality of normally open electromagnetic valve installing holes which are aligned horizontally in the base unit, and spaced apart from each other and structured to accommodate normally open electromagnetic valves;
      a plurality of normally closed electromagnetic valve installing holes which are positioned below the normally open electromagnetic valve installing holes, the normally closed electromagnetic valve installing holes being (i) aligned horizontally in the base unit, (ii) spaced apart from each other, (iii) positioned parallel, in a vertical direction, with respective to each of the normally open electromagnetic valve installing holes, and (iv) structured to accommodate normally closed electromagnetic valves; and
      a plurality of ports opened to a single upper surface in the base unit and aligned in parallel with each of the normally open electromagnetic valve installing holes and the normally closed electromagnetic valve installing holes, the ports each having a respective passageway in coaxial communication therewith and extending in the vertical direction from each of the ports to axially intermediate portions of the normally closed electromagnetic valve installing holes with lower ends open to the intermediate portions thereof, and intermediate portions of the passageways opened to inner surfaces of the normally open electromagnetic valve installing holes;
   a first suction valve installing hole provided in the base unit and positioned only between a first set of the normally open electromagnetic valve installing holes and a first set of the normally closed electromagnetic valve installing holes, and structured to accommodate a first suction valve; and
   a second suction valve installing hole provided in the base unit and positioned only between a second set of the normally open electromagnetic valve installing holes and a second set of the normally closed electromagnetic valve installing holes, and structured to accommodate a second suction valve.

18. A vehicle brake hydraulic pressure control unit as set forth in claim 17, wherein:
   the first set of the normally open electromagnetic valve installing holes are positioned above the first suction valve installing hole and the first set of the normally closed electromagnetic valve installing holes are positioned below the first suction valve installing hole; and
   the second set of the normally open electromagnetic valve installing holes are positioned above the second suction valve installing hole and the second set of the normally closed electromagnetic valve installing holes are positioned below the second suction valve installing hole.

19. A vehicle brake hydraulic pressure control unit as set forth in claim 18, wherein:
   the first suction valve installing hole is positioned between a first passageway and second passageway of the passageways;
   the second suction valve installing hole is positioned between a third passageway and a fourth passageway of the passageways;
   the first passageway communicates with a first normally open electromagnetic valve installing hole and a first normally closed electromagnetic valve installing hole;
   the second passageway communicates with a second normally open electromagnetic valve installing hole and a second normally closed electromagnetic valve installing hole;
   the third passageway communicates with a third normally open electromagnetic valve installing hole and a third normally closed electromagnetic valve installing hole; and
   the fourth passageway communicates with a fourth normally open electromagnetic valve installing hole and a fourth normally closed electromagnetic valve installing hole.

20. A vehicle brake hydraulic pressure control unit as set forth in claim 19, wherein the first suction valve installing hole lies between two ports of the plurality of ports and the second suction valve installing hole lies between another two ports of the plurality of ports.

* * * * *